United States Patent [19]
Clapp et al.

[11] Patent Number: 6,119,985
[45] Date of Patent: *Sep. 19, 2000

[54] REUSABLE ROCKET-PROPELLED HIGH ALTITUDE AIRPLANE AND METHOD AND APPARATUS FOR MID-AIR OXIDIZER TRANSFER TO SAID AIRPLANE

[75] Inventors: Mitchell B. Clapp, Cedar Crest, N. Mex.; Robert M. Zubrin, Indian Hills, Colo.

[73] Assignee: Pioneer Rocketplane Corporation, Lakewood, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/813,476

[22] Filed: Mar. 7, 1997

[51] Int. Cl.[7] .................................................. B64G 1/40
[52] U.S. Cl. .................. 244/172; 244/135 R; 244/53 B; 244/2; 244/74
[58] Field of Search ............................... 244/2, 160, 162, 244/172, 135 A, 135 R, 58, 59, 63, 73 R, 74, 53 B, 53 R, 62; 60/257, 259

[56] References Cited

U.S. PATENT DOCUMENTS

| | | |
|---|---|---|
| D. 220,980 | 6/1971 | Becker et al. . |
| D. 248,745 | 8/1978 | Jager . |
| D. 256,347 | 8/1980 | McComas . |
| D. 308,043 | 5/1990 | Butler . |
| D. 356,990 | 4/1995 | Weir et al. . |
| 2,713,243 | 7/1955 | Seaver ........................................ 60/257 |
| 3,161,379 | 12/1964 | Lane ..................... 244/53 B |
| 3,261,571 | 7/1966 | Pinnes . |
| 3,285,175 | 11/1966 | Keenan ................... 244/2 X |
| 3,295,791 | 1/1967 | Black . |
| 3,756,024 | 9/1973 | Gay ..................................... 244/172 X |
| 3,955,784 | 5/1976 | Salkeld ..................................... 244/172 |
| 4,265,416 | 5/1981 | Jackson et al. ........................ 244/63 X |
| 4,802,639 | 2/1989 | Hardy et al. ................................ 244/2 |
| 4,901,949 | 2/1990 | Elias . |
| 4,919,364 | 4/1990 | John et al. ........................ 244/53 B X |
| 5,052,176 | 10/1991 | Lebatut et al. ............................ 60/257 |
| 5,090,642 | 2/1992 | Salkeld ..................................... 244/2 X |
| 5,116,251 | 5/1992 | Bichler et al. ........................ 244/53 B |
| 5,295,642 | 3/1994 | Palmer ........................................ 244/2 |
| 5,402,965 | 4/1995 | Cervisi et al. ............................... 244/2 |
| 5,444,973 | 8/1995 | Limerick et al. .......................... 60/257 |
| 5,456,424 | 10/1995 | Palmer ............... 244/172 X |
| 5,564,648 | 10/1996 | Palmer ............... 244/172 X |
| 5,582,366 | 12/1996 | Hamant et al. ..................... 244/135 A |
| 5,873,241 | 2/1999 | Foust ........................................ 60/259 |

OTHER PUBLICATIONS

Archer, R. Douglas and Saarlas, Maido, Introduction to Aerospace Propulsion, Prentice Hall, pp. 479–480, Dec. 1996.

"Introduction to Aerospace Propulsion", Prentice Hall: New Jersey, Jan. 1996, pp. 478–480.

"An Examination of the Feasibility of Winged SSTO Vehicles Utilizing Aerial Propellant Transfer," Robert M. Zubrin and Mitchell B. Clapp, presented at 30th AIAA/ASME/SAE/ASEE Joint Propulsion Conference, Jun. 27–29, 1994.

Primary Examiner—Galen L. Barefoot
Attorney, Agent, or Firm—Holland & Hart LLP

[57] ABSTRACT

A reusable rocket airplane which may be utilized to launch satellites and other payloads into space. The airplane may also be used for rapid surface to surface flight. The reusable rocket airplane may be safely supplied with oxidizer in mid-air, achieve an altitude outside the Earth's atmosphere, and return safely to be used again. The rocket airplane utilizes unique concepts to secure its gas turbine engines for high speed flight, minimize fluid spillage during mid-air oxidizer transfer, as well as employs design features advantageous to the economical building and reuse of the rocket airplane.

5 Claims, 8 Drawing Sheets

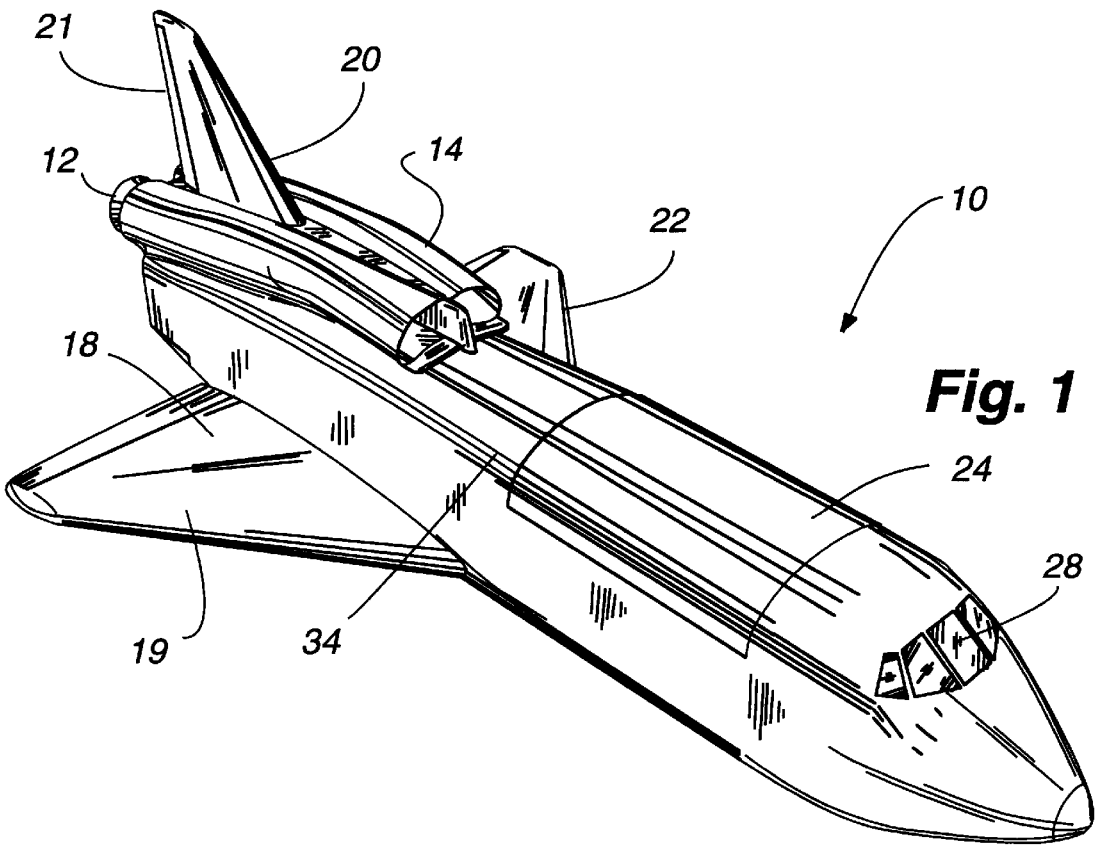
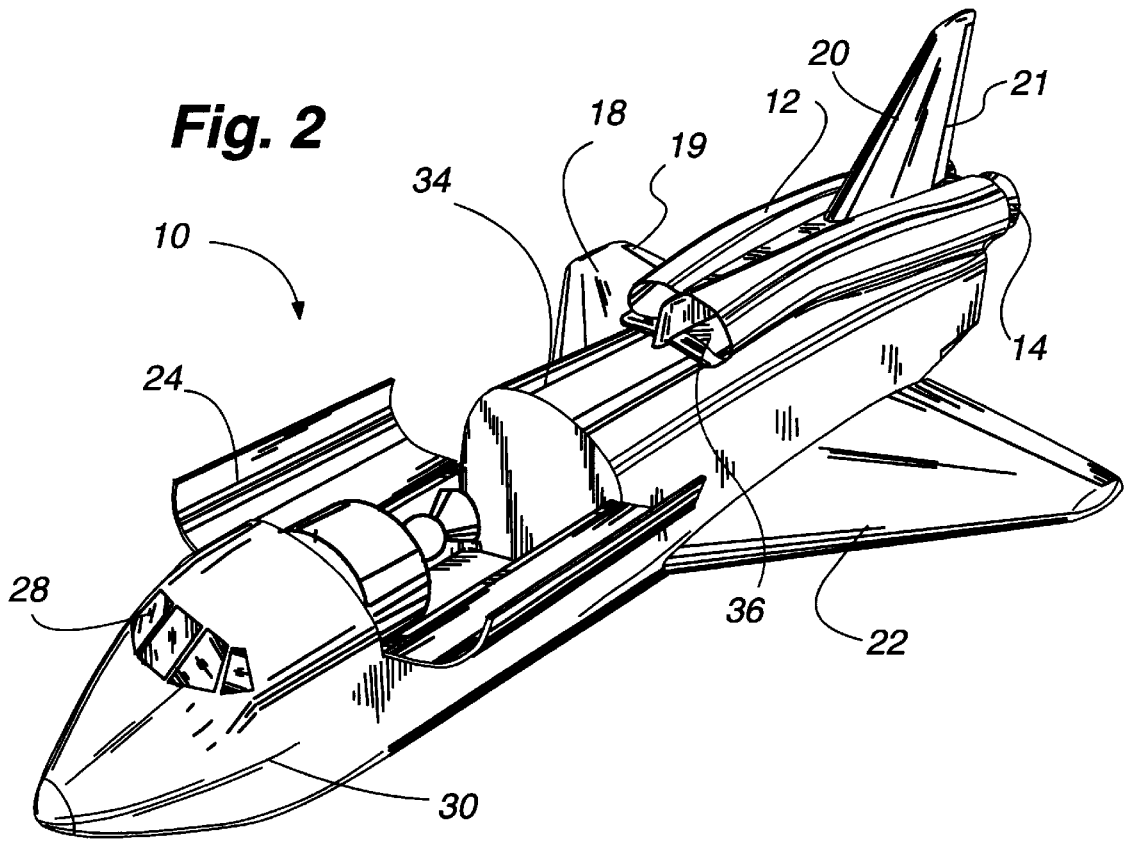

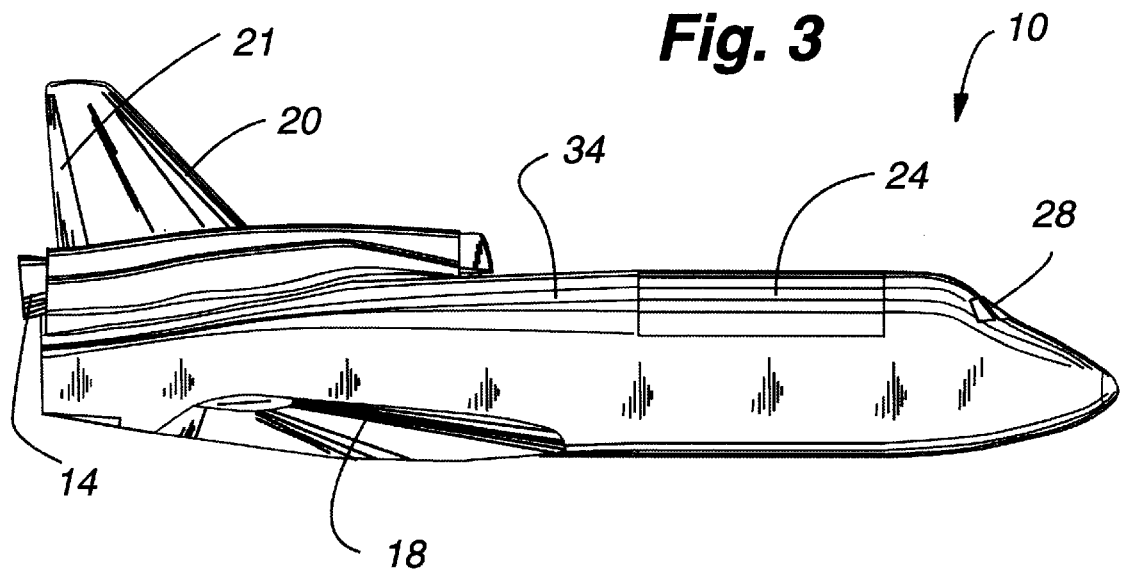
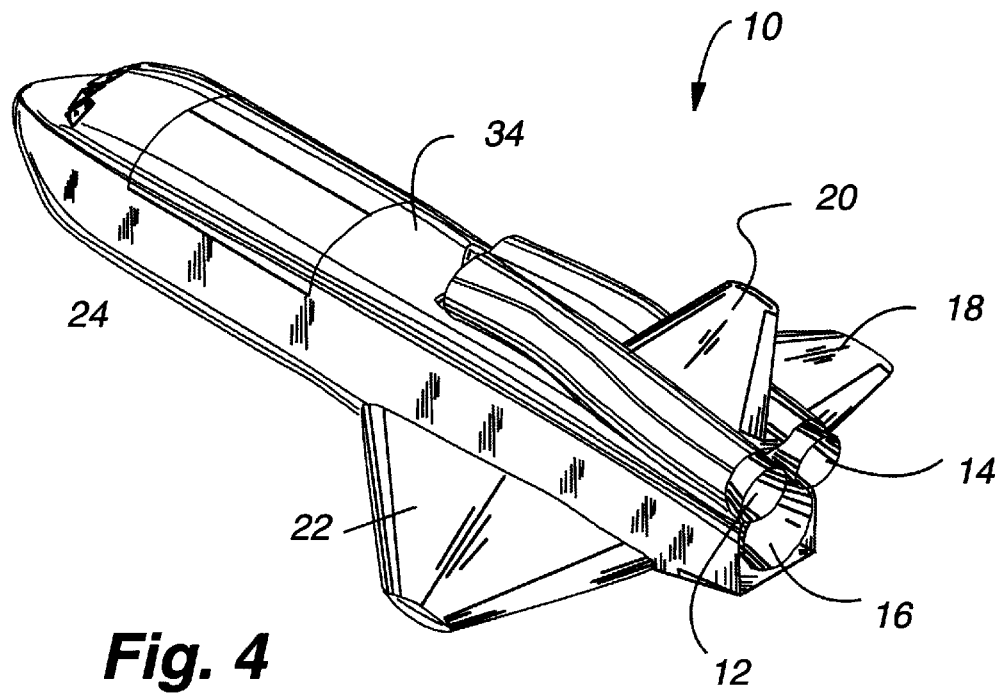

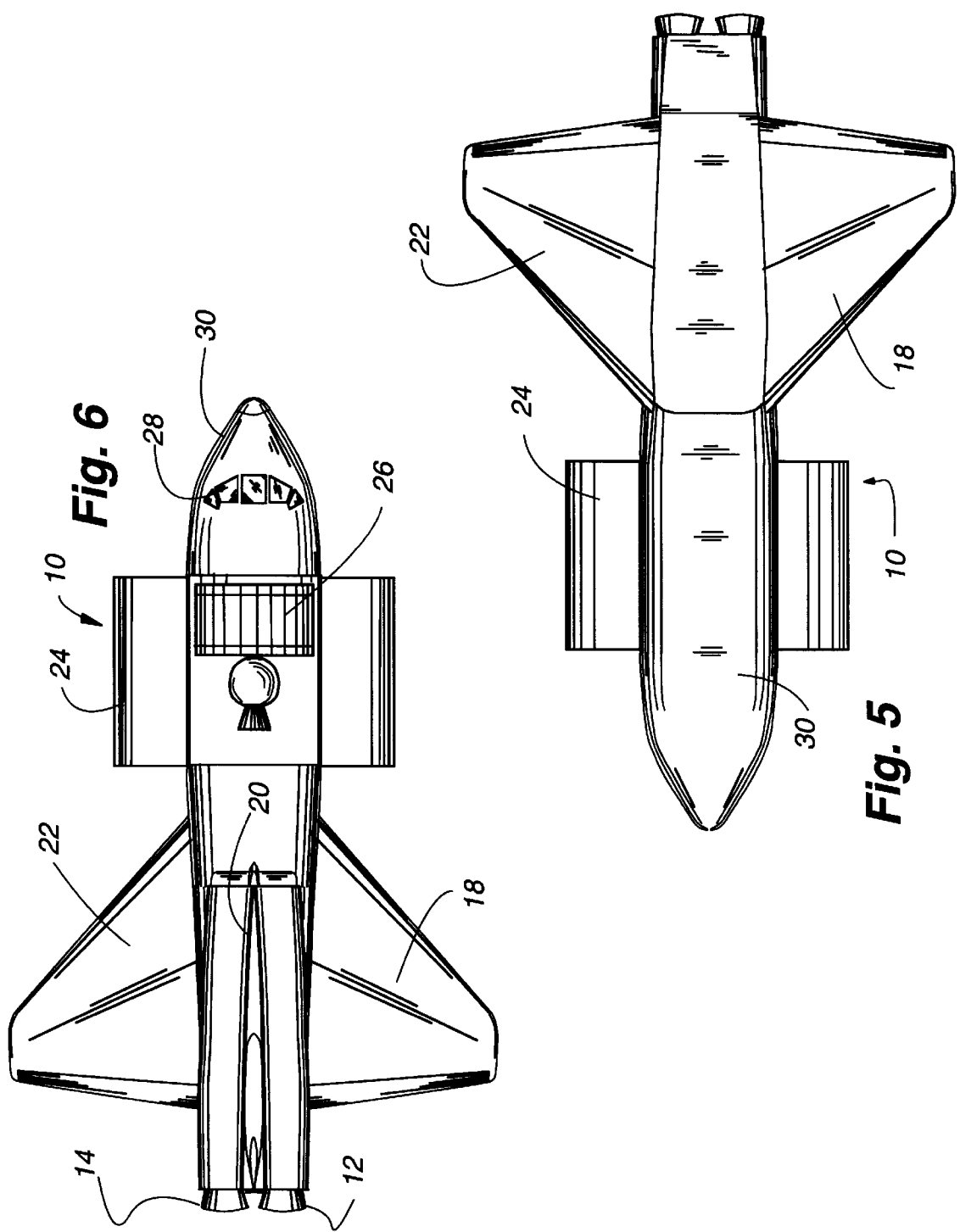

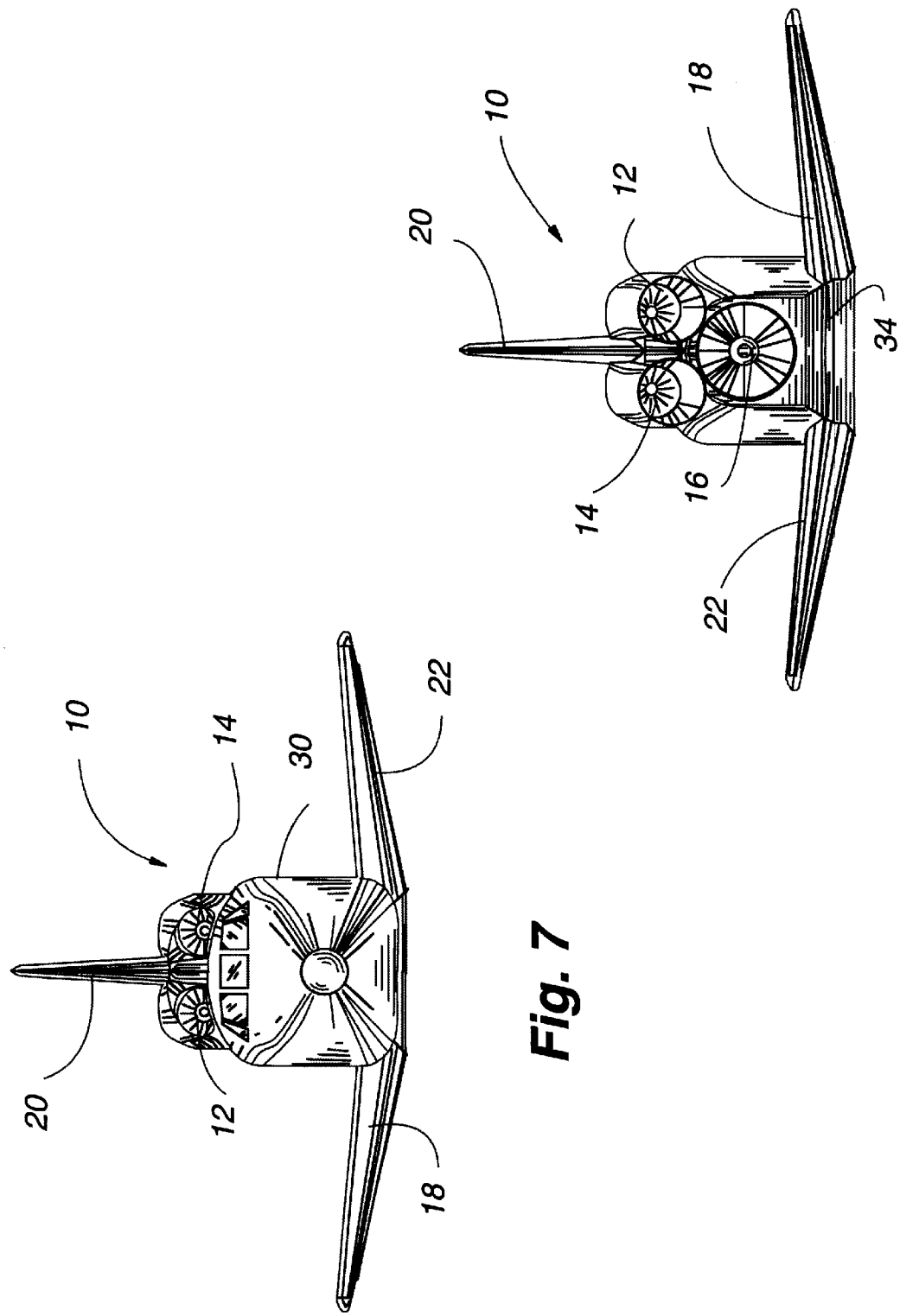

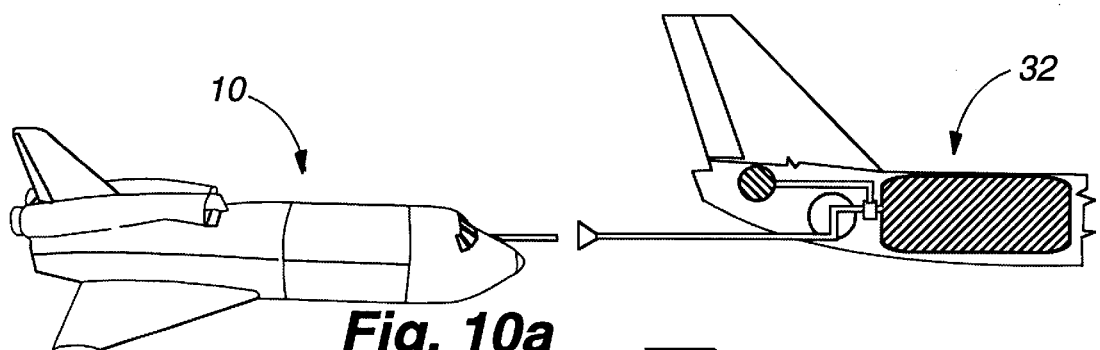
Fig. 10a
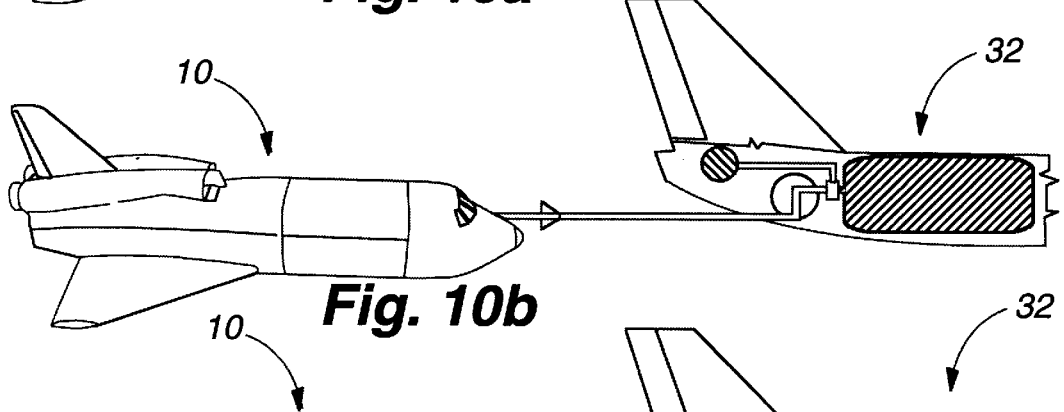
Fig. 10b
Fig. 10c
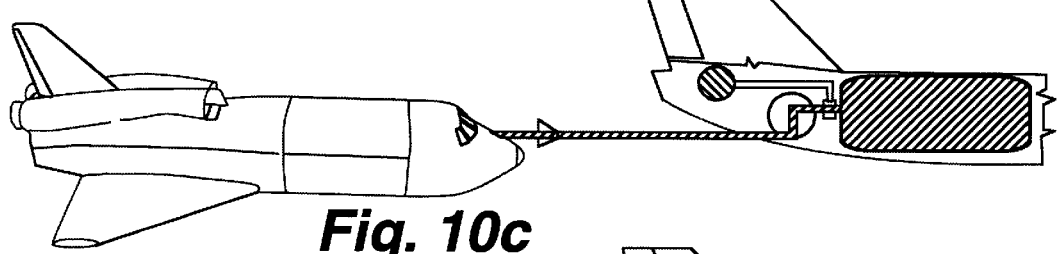
Fig. 10d
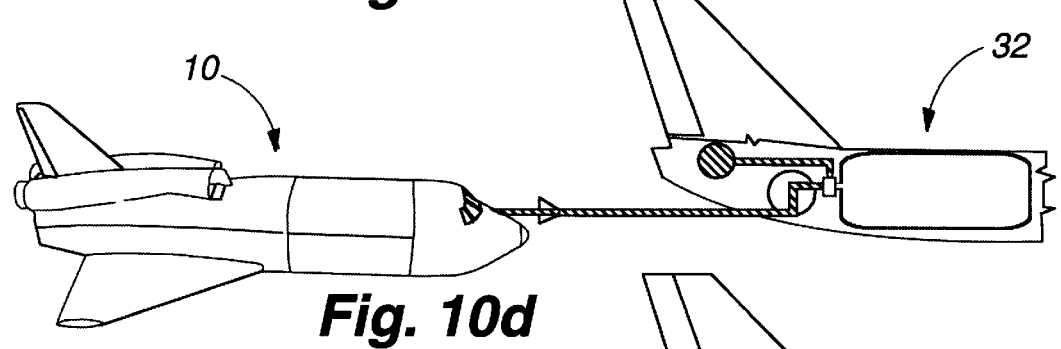
Fig. 10e
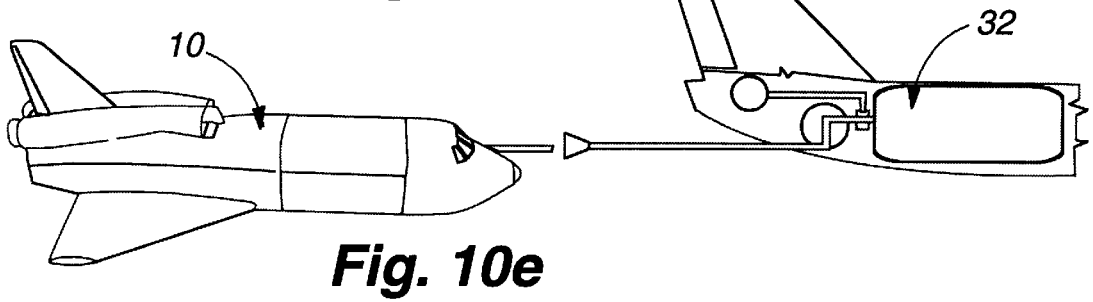

REUSABLE ROCKET-PROPELLED HIGH ALTITUDE AIRPLANE AND METHOD AND APPARATUS FOR MID-AIR OXIDIZER TRANSFER TO SAID AIRPLANE

FIELD OF THE INVENTION

There has been developed a class of airplanes which take off in the Earth's atmosphere, and through a variety of engines, achieve an altitude outside of the Earth's atmosphere. Thereafter, these rocket airplanes return to Earth to be reused again.

BACKGROUND OF THE INVENTION

There is an ever-increasing need for reusable space launch vehicles. An example of a partially reusable spacecraft is the Space Shuttle, used by NASA for a number of years. There were numerous advances made in the development leading up to the Space Shuttle, but for the past two decades, both aviation and space launch vehicle technology have been relatively stagnant. Aviation progress has been limited by acceptance of the limits of propulsion technology based upon, as turbine engines. Commercial aviation manufacturers at present cannot economically provide an aircraft that can travel faster than the speed of sound. This is partly due to the technological challenges of sustained supersonic flight coupled with environmental concerns about noise pollution resulting from sonic booms and ozone layer depletion. Even military aircraft, designed to maximize performance, suffer due to the inherent limits in gas turbine engine technology.

With regard to space launch vehicles, progress is stalled because the principal customers for launch services are governments, which typically are not concerned about commercializing a product. All current space launch systems are expendable systems with huge manufacturing costs for each flight. Testing costs are enormous, and even when all goes well, a typical space launch system can only be used for one application.

With the end of the Cold War, particularly high quality reusable and affordable rocket engines are now available from Russian manufacturers. This advantage, combined with recent advances in aircraft design, manufacturing technology, and our unique and proprietary vehicle concept offers the opportunity for a revolutionary aerospace plane, which uses existing gas turbine engines for take off and landing, existing rocket engines for acceleration to extreme speeds, and existing structural materials technology throughout.

There exists a need to launch satellites on reusable launch vehicles. At present, there are over 1200 small satellite launches planned over the next seven years, which at current prices represents a total market of over ten billion dollars. At present, such satellites will have only two ways of being launched: 1) with the use of the Space Shuttle or similar system, and 2) with the use of a one-launch rocket. There exists a need for a rocket powered airplane ("rocketplane") which can not only launch satellites, but also make possible global same-day package delivery, assist the military, or offer the potential to fly passengers across the globe in less than an hour. With the ever-growing expansion of trade and travel across the Pacific Rim, potential long-range sales of such vehicles are astronomical.

Reusable rocketplanes have been disclosed. In U.S. Pat. No. 5,295,642, a high altitude rocket airplane is described. The plane takes off with the normal use of gas turbines, and reaches an altitude of approximately 25,000 feet. At that altitude, there is an in-air fuel transfer with the use of a flying tanker. Thereafter, two rocket motors are used to supplement the airplane propulsion to bring the rocket airplane up to an elevation of 80,000 to 156,000 feet. At this stage, the airplane is part rocket, part airplane. After 156,000 feet, only the rocket engine is propelling the rocket airplane, and at this altitude, a satellite or other payload can be launched. Thereafter, the rocket airplane returns to the Earth's surface.

What is needed is an efficient system which allows the mid-air transfer of oxidizer with minimal spillage, as this is the largest part of the propellant mass.

There is a need for a piloted rocketplane which can be tested incrementally and under FAA regulations.

There is a need for a rocketplane that can fly over populated areas without needing restrictive range safety procedures.

There is a need for a rocketplane that has a pilot that backs up an autonomous flight control system, thus reducing the cost and risk of flight control software development.

There is a need for a rocketplane that uses only air-breathing, engines for takeoff and landing.

There is a need for a rocketplane that requires a low maintenance thermal protection system.

There is a need for a rocketplane that uses no toxic propellants.

There is a need for a rocketplane that does not use liquid hydrogen.

Finally, there is a need for a rocketplane that utilizes standard production jet engines.

SUMMARY OF THE INVENTION

The present invention is generally directed to a reusable rocket airplane. In particular, it anticipates a rocketplane powered by two gas turbine engines, and one kerosene/oxygen-burning rocket engine. The aircraft is designed to take off with its gas turbine engines, climb to about 25,000 feet where it meets a tanker. It will then receive a transfer of approximately 115,000 pounds of oxidizer from the tanker. After disconnecting from the tanker, the rocketplane lights its rocket engine, shuts down its jet engines, and climbs to about 80 nautical miles in altitude. At this altitude, the aircraft is outside the Earth's atmosphere and can open its payload bay doors and release the payload with a small solid rocket upper stage motor which thereafter delivers the payload to its intended orbit. The doors are then closed and the rocketplane reenters the atmosphere. After slowing down to a subsonic speed, the gas turbines may be restarted and the rocketplane flown to a landing field.

The present invention presents many advantages in a single rocketplane which were not available prior to this patent application. These inventive concepts generally include a unique aerial oxidizer transfer means which minimizes spillage, a novel shut-down and relight procedure, the integration of the rocket engine into the plane, and the heat shield on the plane.

BRIEF DESCRIPTION OF THE DRAWINGS

FIG. 1 is a perspective view of the rocket airplane of the present invention.

FIG. 2 is the perspective shown in FIG. 1 with the payload doors shown open.

FIG. 3 is a general schematic of the side view of the rocketplane of the present invention.

FIG. 4 is an elevated rear view of the rocketplane of the present invention with its payload doors closed.

FIG. 5 is a bottom view of the rocketplane of the present invention with its payload doors open.

FIG. 6 is a top view of the rocketplane of the present invention with its payload doors open.

FIG. 7 is a frontal view of the rocketplane of the present invention with its payload doors shown closed.

FIG. 8 is a rear view of the rocketplane.

FIGS. 10*a*–10*e* is a series of schematics of the mid-air oxidizer transfer mechanism of the present invention.

DETAILED DESCRIPTION OF THE PREFERRED EMBODIMENT

The rocket airplane (hereinafter "rocketplane" or "plane") of the present invention is an advance over all existing rocket airplanes. The present invention utilizes numerous advanced features which previously have not been shown in existing rocket airplanes nor described in existing designs.

FIGS. 1–10 illustrate one embodiment of the plane 10 of the present invention. The preferred plane is a two-seater rocketplane powered by two jet engines shown as 12 and 14. The plane can be much larger and hold a greater number of pilots and passengers. In the preferred embodiment, the engines are Pratt Whitney F100 engines. There is a third engine, which is a kerosene/oxygen-burning rocket engine. This engine is shown as 16. Preferably, this is an RD-120 rocket engine available from Pratt & Whitney. Other engines include the RS-27, from Rocketdyne, or the NK-31,33,39 or 43 engines from Aerojet. However, many different rocket engines or jet engines may be used, depending on design criteria.

Figure 9:
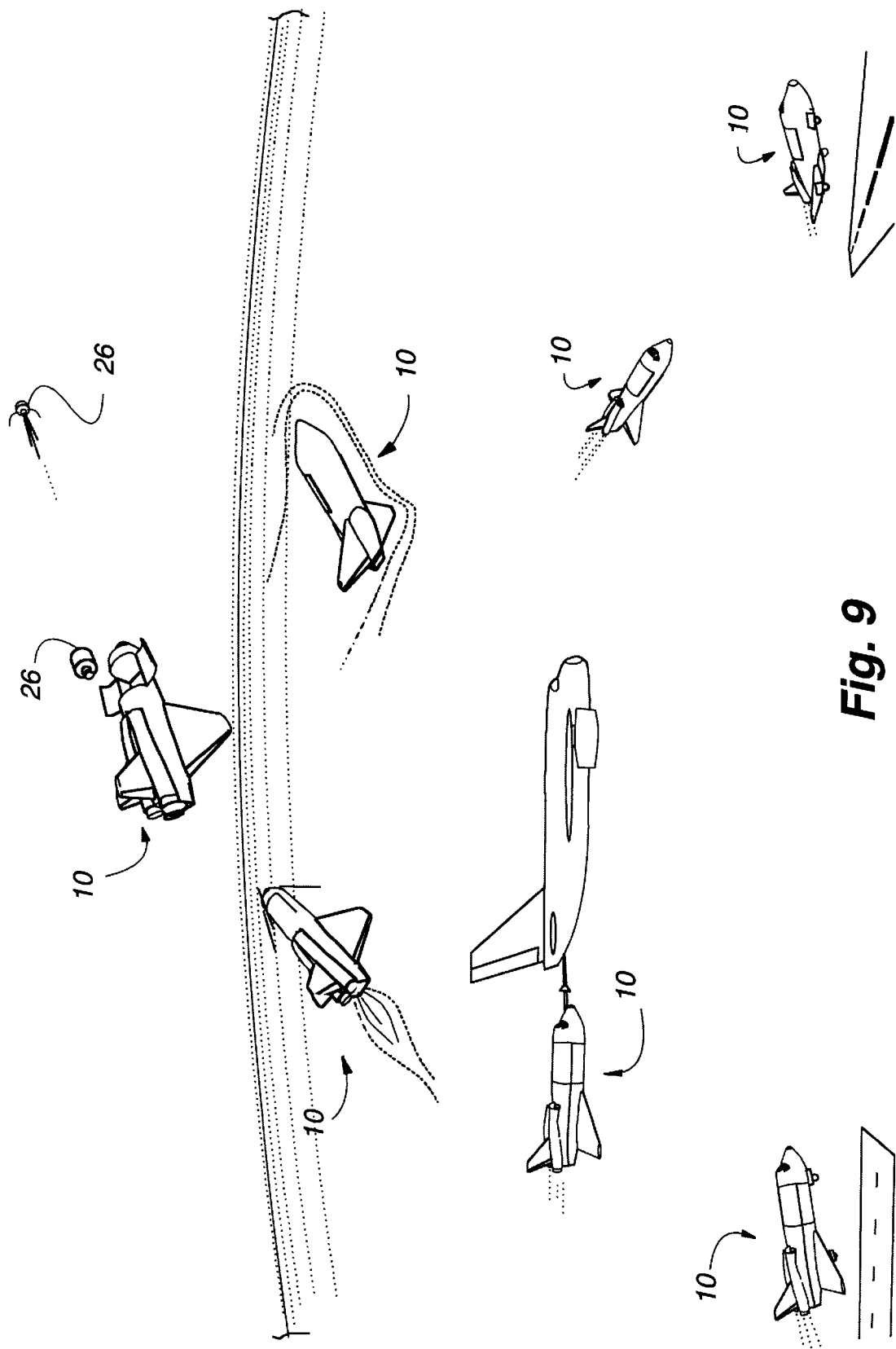
FIG. 9 is a general schematic of the procedure by which the rocket airplane takes off, is refueled, launches its payload and returns to Earth.

The flight sequence of the rocketplane of the present invention is generally shown in FIG. 9. This flight sequence illustrates the rocketplane taking off, oxidizer transfer in mid-flight, and then reaching an altitude wherein a payload may be released or other experiments performed. Thereafter the rocketplane reenters the Earth's atmosphere and lands. The rocketplane 10 is designed to take off with its gas turbine engines and climb to approximately 25,000 feet where it meets the tanker 32 in mid-air. The tanker 32 then transfers approximately 115,000 pounds of liquid oxygen from the tanker 32 to the rocketplane 10. After disconnecting from the tanker 32, the rocketplane 10 lights its rocket engine 16 and climbs to about 80 nautical miles in altitude, flying at a speed of approximately 12000 feet per second At 80 nautical miles altitude, the rocketplane 10 is outside the Earth's atmosphere and can open its payload doors 24, and release its payload 26, such as a satellite, with a small rocket upper stage, which delivers the payload 26 to its intended orbit. The doors 24 are thereafter closed and the rocketplane 10 reenters the atmosphere. After slowing to subsonic speed, the gas turbine engines 12, 14 are restarted and the rocketplane 10 is flown to a landing field. The present invention does not require releasing any payload. The plane can be used for high speed delivery of packages, or high speed passenger transportation.

There are numerous advances in the present rocketplane which are not shown in the prior art. The preferred embodiment is described in detail below, and illustrated in the accompanying figures.

The preferred airframe has a delta-wing planform 18 with a single vertical tail 20, with control surfaces across the trailing edge 19 and fin 21, as shown in FIG. 2. The fuselage 34 is generally cylindrical and contains an integral oxidant tank. The crew sits in a side-by-side layout forward of the payload bay. The preferred aircraft is structurally limited to a peak normal acceleration of about 4.5g at a take-off weight of 102,000 pounds. Integral oxygen tanks are preferred, but nonintegral tanks are also possible. The preferred structural material used throughout the plane is graphite fiber composite. Alternative designs include those using win-lets and nonintegral oxygen tanks.

The wing shown is a swept delta wing with a preferred taper ratio of about 15%. The leading edge is swept at about 50 degrees and the trailing edge is swept at about 5 degrees. These angles are visible in FIG. 5. Preferably a 65 series airfoil is used, with a thickness to chord ratio of about 10% at the wing root. There may also be a leading edge extension, designed to reduce the center of pressure shift done during the transition from subsonic to hypersonic flight. The preferred total area of the wing is approximately 900 ft$^2$.

In the preferred embodiment, structurally, the wing is a rigid box beam, with no aerodynamic surface at all. The thermal protection system will be applied to this exceptionally rigid structure and machined to a final shape. The machining process involves preferably a numerically controlled mill. The rigid wing box structure is designed to contain the fuel used by both the air-breathing and rocket engines, described in greater detail below. Alternatively conventional construction techniques using an aerodynamically contoured wing structure may also be used.

The fuselage 34 is a shell of, preferably, about 136 inches diameter, flattened at the bottom to match the wing lower surface contour, as shown in FIG. 5. It tapers at the front to enclose the cabin and has a nose radius of about 6 inches. The fuselage is designed to carry all of the bending loads of flight and react to the thrust loads from both the airbreathing and rocket engines, although the delta wing, being long of chord at the root, shares much of the bending moment-induced loads.

The tail 20 is a single fin of about 100 ft$^2$ total area and a thickness to chord ratio of 8%. It is constructed in a similar fashion to the wings 18, 22.

Computational aerodynamic analysis tools have been used to estimate the aerodynamic performance of the rocketplane of the present invention. The center of gravity is at about 5% of the mean aerodynamic chord (MAC), both with the tanks fully loaded and completely empty. As a result, the rocketplane is aerodynamically stable for all flight phases.

In the preferred embodiment, the crew sits side by side in a pair of ejection seats similar to those used in fighter jets. The seats provide an ejection envelope from the surface and rest to Mach 1.2 and 50,000 feet. Above that altitude, the crew will be required to remain with the rocketplane in case of emergency until they are within the ejection envelope.

In the preferred embodiment, the displays in the cockpit will be manufactured by Honeywell as part of the avionics subsystem. Displays include both conventional aircraft displays and specialized displays for the flight test mission. The rocketplane is flown by the left seat pilot by means of a side stick controller in the center console and a throttle on the left rail. The right seat pilot also has a throttle on the right canopy rail. Crew displays will include emergency abort indications and steering. Conventional rudder pedals will be used to provide pilot yaw inputs to the control system during the gear down configuration, but not used during gear up flight.

The landing gear system will employ a conventional tricycle landing gear system. The nose gear retracts forward beneath the crew compartment and the main gear retracts forward to rest inside the wing. Carbon brakes are used to manage the heat generated during full gross weight rejected takeoffs. The nose gear is thermally controlled by the same system used to cool the cabin. The main gear employs SR-71 high temperature tires, which are pressurized with nitrogen at 400 psi and specially designed for elevated soak temperatures during flight. Preferably, the landing gear would be purchased from Scaled Composites, a manufacturer of lightweight landing gear.

The preferred rocket engine, the RD-120, available from Pratt and Whitney, a manufacturer of first-of-a-kind airplanes and lightweight landing gear, requires liquid $O_2$ inlet pressure of 71 psi and fuel inlet pressure of 57 psi at start. Once the engine is running, the propellants must be delivered to the engine at 39 psi for the liquid $O_2$ and 35 psi for the fuel. A gaseous helium bottle inside the oxidizer tank is charged before flight with 20 liters of helium at 3200 psi and used to pressurize the oxygen tank and the kerosene tanks and to drive the engine boost pump as required. The preferred oxidizer is liquid oxygen. However, other oxidizers such as hydrogen peroxide, nitrogen tetroxide, or a combination of oxidizers, may be used.

Because the aircraft in the preferred implementation has a large wing, it does not require the rocket engine to move during, main engine operation to maintain flight control. In aerodynamic flight, the wing control surfaces are sufficient to steer the aircraft. During exoatmospheric flight, the reaction control system thrusters are sufficient to steer the aircraft.

The rocket engine requires high inlet pressures for both propellants at start and somewhat reduced inlet pressures once the engine is running. In either case, the engine requires a propellant supply in excess of the tankage storage pressure.

Figure 11:
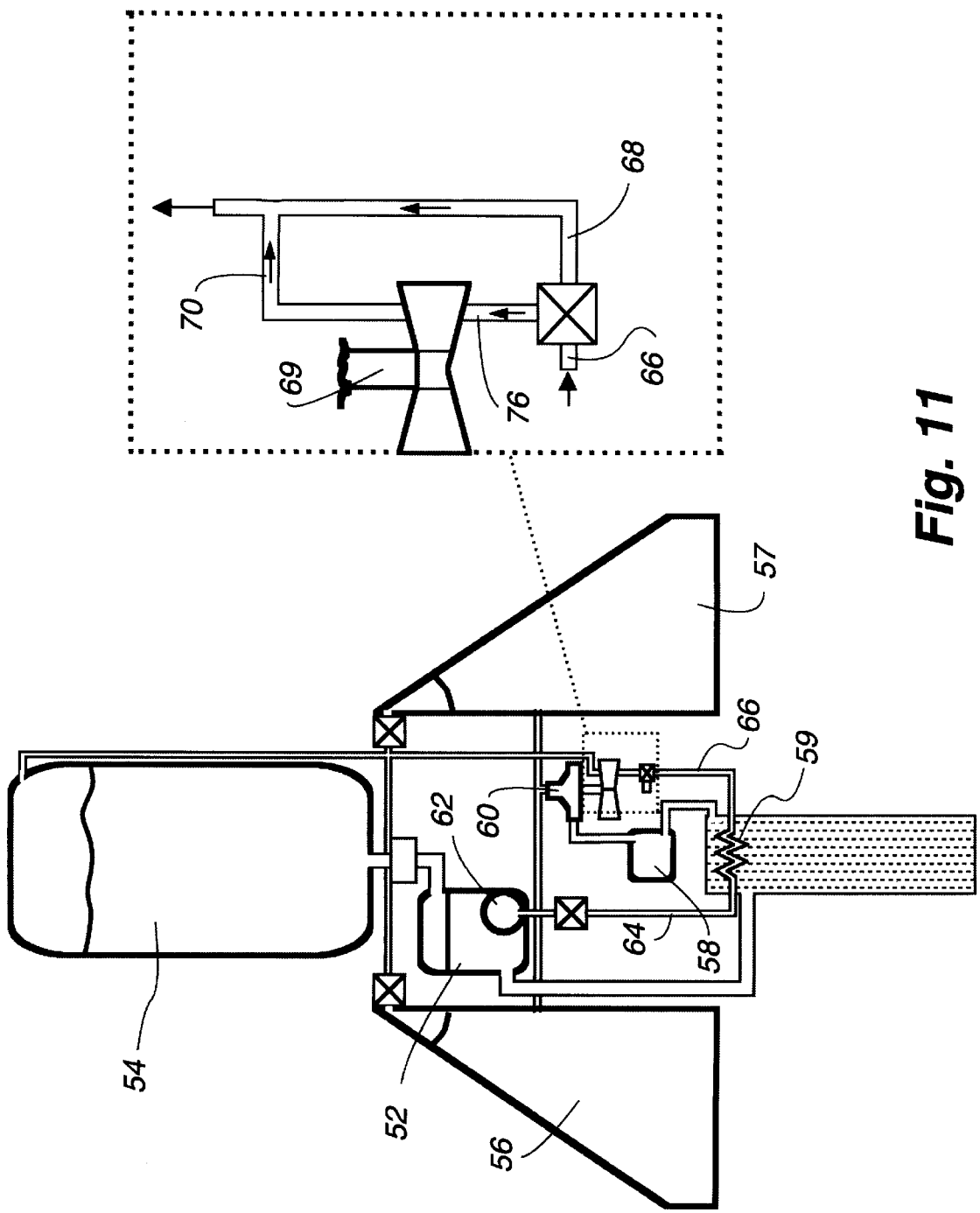
FIG. 11 is a schematic of the rocket engine propellant feed and pressurization system.
Figure 12:
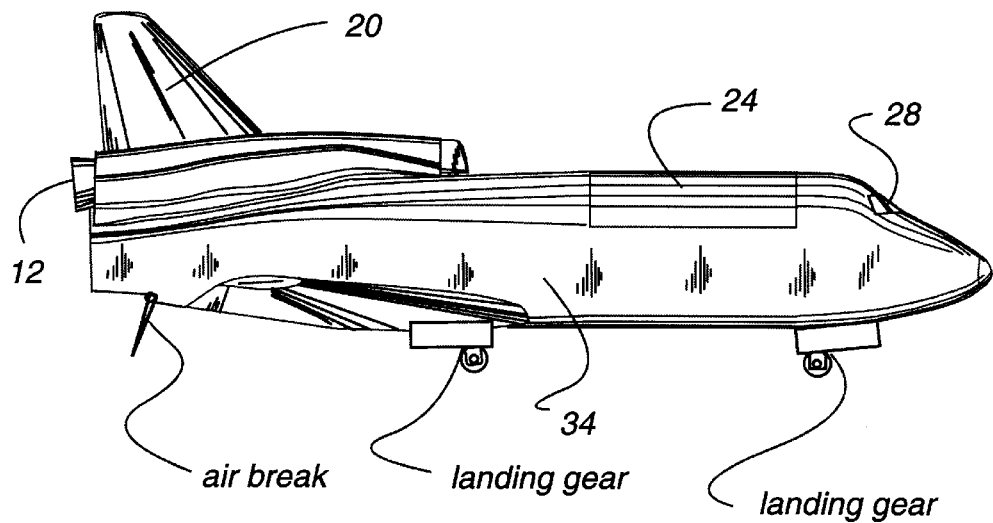
FIG. 12 is a perspective view illustrating the preferred landing gear for the present invention.

Both the oxygen and fuel systems have a start tank which is pressurized to the required engine start pressure. The propellant fuel and pressurization system is shown in FIG. 11 (which is a preferred embodiment). Tank pressure is not high enough in the wing tanks (56 and 57) to permit the engine to operate. As a result, an additional boost pump 60 raises the propellant pressure from the tank pressure to the required operating pressure. The boost pumps require a gaseous helium driven turbine. The gaseous helium bottle charged before flight provides the pressure to drive this turbine.

The rocket engine of the rocketplane preferably requires a liquid $O_2$ (preferred oxidizer) inlet pressure of 71 psi at the liquid $O_2$ start tank 52 and a fuel inlet pressure of 57 psi at the fuel start tank 58. Once the engine is running, the propellants must be delivered to the engine at 39 psi for the liquid $O_2$ and 35 psi for the fuel. A gaseous helium bottle 62 inside the liquid $O_2$ tank is charged before flight with 20 liters of helium at 3,200 psi.

The preferred fuel tanks 56 and 57 are integral to the wing. The fuel pressure inside the tanks is limited to no more than 10 psi to avoid excessive internal forces. During air-breathing flight, this pressure is maintained by compressor bleed air. During rocket flight, the gaseous helium system maintains the 10 psi tank pressure.

The preferred fuel boost pump 60 requires 24 horsepower to operate and is powered by a gaseous helium driven single stage impulse turbine 69. The nominal gaseous helium flow rate of 0.22 lb/s 66 is enough to drive the turbine. The turbine 69 consumes 0.05 lb/sec of helium at 445° F. and 750 psi at the inlet 76. The turbine has an input helium pressure 76 of 750 psi and an output 70 pressure of helium at 42 psi. The helium boosts the fuel pressure from 10 psi at the inlet to 35 psi at the outlet.

The helium is stored at 3200 psi in the tank 62. The helium flows through 64 at 1280 psi, goes through heat exchanger 59, exits 66 at 1150 psi, and enters turbine 69 at 76 at 750 psi.

The oxidizer tank 54 is integral to the rest of the airframe structure. It is designed to operate at a pressure of 39 psi, which is maintained during main engine operation by the gaseous helium system. All oxygen flows from the main tank to a smaller start tank 52. Initially at 71 psi, the start tank pressure decays until a check valve permits oxygen from the main tank to flow into the start tank and from there into the engine at 39 psi.

The oxidizer tank is of a composite design with an aluminum liner and externally applied Rohacell foam. The tank is integral to the rest of the airframe structure. It is designed to operate at a pressure of 39 psi, which is maintained during main engine operation by the gaseous helium system. All oxygen flows from the main tank to a smaller start tank. Initially at 71 psi, the start tank pressure decays until a check valve permits oxygen from the main tank to flow into the start tank and from there into the engine at 39 psi.

The gas turbine engines of the rocketplane are preferably Pratt and Whitney's F100 series fighter aircraft engine. The F100 is an augmented gas turbine with a 13 stage axial compressor, an annular combustor, and an air-cooled turbine. The engine is controlled by an analog electronic engine controller with a hydromechanical backup controller. The engine is also equipped with a jet fuel starter to reduce ground support equipment and allow reliable airborne starting below 20,000 feet.

The rocketplane of the present invention has six primary aerodynamic control effectors. They are the port and starboard elevons, port and starboard flaps, a centerline body flap, and a rudder. Preferably, none of the control surfaces are split, and the speed brake function is achieved by differential displacement of the elevons and flaps. Each surface is constructed similarly to the wing.

The aerodynamic control surfaces will be operated by electrohydrostatic actuators. These actuators have been tested on the F-18 Systems Research Aircraft by the NASA Dryden Flight Research Center. The actuator consists of a small, electronically driven, hydraulic pump located near the hydraulic device. As a result, the system does not require the routing of high-pressure hydraulic lines and if it fails, it does not immobilize the control surface.

The preferred electrical system is designed to provide appropriate current to the various systems around the rocketplane. It includes a 270 volt DC bus, which primarily runs the control surface actuators, a 28 volt DC bus, which is required by the reaction controls system, main engine, and avionics, and a 120 volt AC system which powers some miscellaneous functions. The primary power is derived from a set of generators driven by the air-breathing engines and supplemented by flywheel batteries manufactured by SATCON Inc. of Cambridge, Mass. There is also a provision for a ram air turbine and an emergency power unit for additional power.

A standard air conditioning system will be operated off of compressor bleed air, with supplemental air provided for use after air breathing operation. A standard liquid oxygen system provides emergency breathing gas for the crew, who fly in pressure suits.

During ascent and reentry, the aircraft requires a device to prevent high stagnation temperature air from contacting the compressor face, which could damage it. In the preferred implementation, this function is performed by a device internal to the duct which performs the sealing function.

FIG. 1 illustrates an inlet closure device. The inlet needs to be closed for high speed flight beyond Mach 2. The inlet duct extends from the compressor face to the top of the aircraft, where a normal-shock inlet provides stagnation pressure recovery for the gas turbine engines and a boundary layer diverter prevents the ingestion of the turbulent boundary layer.

Alternative approaches include devices that move in front of the inlet to provide both the blocking and sealing functions, and moving the entire duct or a portion of the duct to the inside of the aircraft. An example of such an alternative system is the "carrot" consisting of a rotating half cone that can be used to open or close the inlet.

In the preferred implementation, the engines are operated long enough to verify that the rocket engine has ignited properly. This provides an additional margin of safety because the airbreathing engines are still available and operating properly if the rocket engine fails. The airbreathing engines may also be operated into the low supersonic range for additional performance.

There are two approaches to securing the engines for high speed flight. The preferred implementation is to perform a normal shutdown This is done after rocket ignition. The engines are reduced in power to idle thrust, then shut off and allowed to windmill for ten seconds before the inlets are closed. Full closure will be complete by the time the aircraft has achieved supersonic flight. The engines will come to rest slowly in their housings as the aircraft continues on rocket power to high altitude and airspeed. After reentry, the aircraft will decelerate to a subsonic speed, at which time the inlets can be reopened and the engines can be monitored. When the aircraft has descended low enough, the jet fuel starter installed on the engine may be used. The starter rotates the engine until it can be ignited, after which a normal landing can be performed. If neither engine lights, the aircraft will be flown to a runway and landed with the power off.

Lubricant might be lost during high altitude flight. If this presents a problem, extra lubricant can be supplied from an internal reservoir.

The second approach for engine disposition during high speed flight is to continuously rotate the engine with the jet fuel starter or auxiliary power unit through the flight so that the engine never comes to rest. This is not the preferred approach because it requires a fairly large power expenditure throughout the flight and will make the aircraft weigh more. Additionally, the angular momentum of the rotating engines will cause precession of the aircraft during RCS burns, which the flight control system will have to recognize and counteract. Nonetheless, once the inlets are closed, the external source need only provide enough power to overcome bearing drag. The engine will probably be somewhat more reliable on relight, as well, since it is already rotating The position of the inlet 36 in the preferred implementation is on top of the aircraft, directly behind the payload bay. The advantage of positioning the inlets here is that they are at the coolest part of the aircraft during reentry. Additionally, the structural interfaces with the rest of the aircraft are simplified by this arrangement, since the wing and fuselage structure need not be compromised to accommodate the engines, ducts, and related hardware.

Alternative positions for the inlets are the wing roots and the upper surfaces of the wing.

A significant aspect of the present invention is the transfer of oxidizer from the mid-air tanker to the rocketplane. The current systems used to transfer fuel are not compatible with transfer of oxidizer. The materials are not designed for cryogenic temperatures, the standards of cleanliness that apply inside the plumbing are high, but not of liquid oxygen standard, and the transfer rate, all other things being equal, is not as high as might be desired. At a minimum, a liquid oxygen tanker aircraft would need dedicated liquid oxygen tanks, valves, flexible lines, and pumps. This will entail modification to the tanker.

As a result, in the preferred implementation, the tanker aircraft can be any of a large variety of transport aircraft, including but not limited to, the Boeing 707 or 747, the Lockheed L1011, the Douglas DC-10, or the existing KC-10 or KC-135 tanker aircraft. If an existing tanker is used, the amount of engineering needed safely to carry and transfer liquid oxygen rivals the amount of engineering needed to make a tanker aircraft out of an existing transport. In both cases, the aircraft will require new tanks, pumps, lines, boom or drogue, and valves.

If the aircraft obtained for this application is already a boom-type tanker aircraft (i.e., it is a KC-135 or KC-10), then the existing system should be modified for oxygen transfer. Although the pumps, tanks, valves, and possibly the boom itself would have to be replaced, the presence of the operator station in the back of the aircraft as well as the structural interfaces needed to transfer the loads from the boom into the aircraft are already there. If the tanker is a surplus airliner, however, a probe and drogue system should be implemented. The advantage of such a system is that all of the engineering is internal to the aircraft and does not affect its airworthiness. Both boom and probe systems are capable of supplying the transfer propellant at a high rate.

Pumps and plumbing are highly developed for the conventional liquid oxygen industry as well as the rocket industry. In the preferred implementation, a surplus rocket engine liquid oxygen pump with an external shaft drive would be used. This will assure the maximum safety and give high flow rates at reasonable cost and weight. For fluid transfer lines, both from the tankage to the pump and from the pump to the receiver aircraft a stainless steel bellows is used with a stainless steel braided cable overwrapping. This permits the liquid oxygen to flow at high rates. It also allows the transfer lines to accommodate the relative motions of the two aircraft, whether a boom system is used and telescoping is required or whether a probe and drogue system is used and greater flexibility is needed. An alternative approach is to discharge the contents of the tanker by means of a gaseous pressurant.

FIGS. 10(a)–10(e) disclose the preferred steps of oxidizer transfer. FIG. 10(a) shows at the pre-contact position. The receiver aircraft pilot maneuvers the rocketplane behind the tanker, so that the rocketplane's probe is aligned with the tanker's drogue. The transfer hose has been extended by the tanker to its full length. FIG. 10(b) shows at the contact position. The pilot flies the rocketplane forward so that a mechanical seal between the probe and drogue is achieved The pilot pushes the drogue towards the tanker. FIG. 10(c) shows after the transfer hose has shortened to a defined threshold, the main valve permits flow to occur from the oxidizer tank through the transfer hose, into the probe, and hence to the rocketplane's tanks. FIG. 10(d) shows if the transfer hose is reextended beyond the defined threshold, the purge gas source discharges into the transfer hose and the probe, so that the fluid in the hose and the probe is entirely driven into the rocketplane. FIG. 10(e) shows by the time the rocketplane withdraws beyond the full length of the transfer hose, the hose is dry. The mechanical disconnect occurs at this time. The tanker and rocketplane aircraft maneuver apart from one another and the rocketplane continues with its mission. At the receiver end of the propellant transfer system, the interface between the tanker and receiver aircraft must be able to capture and seal securely, and also permit purges between the two aircraft to take place. Although it is fairly common for conventional tankers to spill small amounts of propellant on the receiver aircraft at disconnect, this cannot be allowed in an liquid $O_2$ transfer system for safety reasons. A heater may also be used to prevent frost build-up at the junction.

The transfer rate in the preferred implementation should be set as high as possible, with a minimum value of 1000 gallons per minute. The advantage of this is that a fuel consumed during oxidizer transfer is not replaced by the tanker. As a result, the fuel wasted during transfer needs to be minimized.

In the preferred implementation, the tanker carries the oxidizer, whether it is liquid oxygen or some other fluid, in parasitic, nonintegral tankage. The purpose of this is to minimize the modifications required for rocket propellant transfer. Tankage should in the preferred implementation be the vacuum-jacketed Dewar type, in which liquid oxygen can be safely stored for several days. An alternative approach is to make the rocket propellant transfer tankage integral to the tanker aircraft.

In the preferred implementation, the thrust of the air-breathing engines is sufficient to maintain the tanker in level flight at the moment of disconnect. It is also possible to fly the tanker and receiver in a slight descent to reduce the requirement for lift for the receiver aircraft, and hence to reduce the thrust required for flight. It is also possible for the tanker to tow the receiver aircraft to reduce or eliminate the need for propulsive thrust.

A thermal protection system is required on the rocketplane of the present invention to allow it to reenter the Earth's atmosphere safely. The present invention prefers an Alumina Enhanced Thermal Barrier (AETB) tile with a Toughened Uni-Piece Fibrous Insulation coating (TUFI-C) as the sole thermal protection system for the entire vehicle. AETB/TUFI-C is rugged, and when damage occurs, only small tiles rather than large blankets need to be repaired or replaced. Computer modeling has predicted a surface temperature of not more than 2,400° F., compared to over 3,000° F. for the Shuttle. Although the tile is over-designed for the peak temperature seen over most of the vehicle, the heat flux into the structure still needs to be reduced, and a thinner layer of tile serves well for this purpose. Finally, a single tile system avoids materials interfaces between different thermal protection materials.

The tile would be preferably installed by direct bonding to the substructure in the preferred implementation. After installation of the tiles, the aerodynamic surfaces will be machined to final shape in a mill. Any coatings necessary to increase the toughness of the material will be applied after installation. The advantage of this scheme is that it is not necessary to build the wing to a high degree of aerodynamic precision. Also, the interface between the wing and the tile can be standardized in a flat shape, so that the precision machining is not needed for the portion of the tile that is bonded to the aircraft. Alternatively, the tiles can be machined elsewhere.

The oxidizer tank is integral to the fuselage in the preferred implementation. It is designed to operate at a pressure of 39 psi, which is maintained during main engine operation by a gaseous helium system. All oxygen flows from the main tank to the smaller start tank. Alternatively, nonintegral tankage can be used.

The fuel tank is integral to the wing. The fuel pressure inside the tanks is limited to a low pressure to avoid excessive internal forces on the wing. During air-breathing flight this pressure is maintained by a compressor bleed air. During rocket flight, the gaseous helium system maintains the tank pressure. An additional toroidal fuel tank may be applied around the rocket engine to supply additional fuel.

In the preferred implementation, the oxygen tank is divided into two or more segments to permit active control of the center of gravity during rocket engine burn, and to permit the main structural elements of the wing to pass smoothly from one side of the aircraft to the other without interruption.

In the preferred implementation, the architecture that the present invention will use for the avionics functions needed by the present invention will be the Integrated Modular Architecture or IMA developed by Honeywell for the Boeing 777 airliner. The system provides the flexibility of a distributed architecture with the cost benefits and avoidance of duplication of highly integrated system that employs common resources to support various functions.

Other avionics systems with equivalent features may be used. The IMA system eliminates duplication of electronic resources by using common electronics modules for input/output, core processing, built-in test, and power supply. With standard core processing modules, hardware functions can be duplicated for reliability. Because the functions of multiple boxes have been consolidated into a single avionics package, a common parts approach can be used for all the avionics and the number of parts types is kept to a minimum.

In the preferred implementation, the IMA is also modular in software. Each software function is isolated in space and in time from all other software functions by means of a robust partitioning mechanism that forces each hardware and software module to contain its faults and prevents them from propagating. To achieve this, each function (communications, telemetry downlink, inertial reference, etc.) has its own separate memory space that is not shared with any other function. This is "isolation in space." Furthermore, the software functions are isolated in time by deterministic switching between software functions. This means that all software functions are switched from one to the next by a table in each module that schedules in advance all interactions with the four lane wide data bus that connects the modules. For this reason there are no address signals, no arbitration, and no software tick timers. The core operating system used throughout is the same as that used by the Boeing 777 implementation, which initializes the system, schedules resources, manages memory, responds to faults, and loads data.

For the present invention, communications, inertial data, navigation, cockpit displays, power management, command and data handling, health monitoring, and downlink telemetry are all implemented in the IMA boxes, two small cabinets inside the crew compartment that are redundant to one another and internally are each four times redundant. The flight control system, which controls the relationship between the aircraft's command inputs, its sensed air data and inertial status, and the motions of its control effectors, is not integrated with the rest of the avionics system in order to allow its development to proceed on a parallel path.

The present invention will preferably employ standard VHF and UHF voice communication and S-Band telemetry. The aircraft will also be equipped with a C-band beacon and the usual altitude and airspeed encoding Mode 1 and Mode 3 IFF devices for air traffic control safety.

The usual navigational radios (VHF Omni-Range, TACAN, etc.) will provide signals to the IMA cabinets. A conventional instrument landing system will be available to permit cross country ferry flight according to instrument flight rules and to allow testing in a variety of weather conditions. An electronic library will make available to the crew airfield data and navigational and airspace information to permit non-emergency flying procedures to be followed in case of a divert and to enable testing from alternate sites if this is desirable.

The present invention's preferred implementation of the IMA includes an integrated GPS/INS system, where the inertial reference unit, which is a redundant pair of four-spool fiberoptic gyroscopes, is updated by the GPS signal every ten seconds. As a result, the navigation, guidance, and flight controls systems are fed only inertial data to simplify the interface. The inertial data is able to drift for only ten seconds before being updated by fresh GPS information. This approach was implemented with great success on the F-111 fighter Avionics Modernization Program, as well as many other fighter and transport aircraft since then.

Inertial and body axis measurements will be made by a set of redundant units which measure both inertially referenced parameters (Latitude, Longitude, Vnorth, Veast, Vup, Pitch attitude, Roll attitude, heading) and body axis parameters (pitch, roll, yaw rates, normal, lateral, and longitudinal accelerations) necessary for atmospheric and exoatmospheric flight and navigation. These units will provide redundant sources for the desired parameters as well as sources of navigational and display information for the flight deck. Navigational drift and accuracies are well within those necessary to provide these functions for the mission durations for the present invention. The inertial and body axis data are provided from the Honeywell avionics system.

Airmass measurements will build on NASA and B-2 experience with flush air data systems. The air data system of the present invention will utilize a set of flush static ports oriented in a cruciform pattern on the nose of the vehicle. The static ports used will be based upon these tested on the Shuttle. Pressures obtained from these ports will be plumbed to pressure sensors which will transmit this information to the Flight Control Computer (FCC). The FCC will then perform the computation of the necessary airmass signals. A closed form solution of the values of angle of attack, angle of sideslip, Mach number, and dynamic pressure altitude will be derived from these measurements of local pressure and made available to the flight control laws and the flight deck displays. Similar systems have been tested and utilized on the B-2, Shuttle, KC-135, and F-14 and it is felt the technical risks associated with making this air data system the primary measurement system are low when compared with the benefits of its use in flight. To minimize the effects of turbulence (expected in the environment associated with 20 knot crosswinds) complementary filters will be utilized to reduce measurement noise without increasing phase lag.

The control laws will be a traditional design using conventional feedbacks with gain scheduling to augment the vehicle. The command path will also provide gains which vary with flight condition so as to provide sufficient response at low speed without producing over-response at high Mach number. Emphasis on handing qualities will be placed on the landing task, since this is the most critical precise manual control task required of this vehicle. In the powered approach flight phase the control laws will provide a classic aircraft angle-of-attack command type of response.

Two types of control laws are preferred for the up-and-away flight conditions. During cruise flight at subsonic and low supersonic speeds and altitudes below about 40,000 feet the vehicle will typically be flown manually using a pitch rate command system, lateral/directional augmentation, and turn coordination. Above this altitude and Mach value the vehicle will typically be flown in an engaged autopilot mode. These same altitude commands will be supplied through an onboard automatic trajectory system for the high altitude and reentry flight phases. Manual control of the vehicle using, the control stick during the high altitude/Mach phases will be possible with acceptable handling qualities. For manual control of the reentry task, guidance for the desired attitude will be displayed on the pilot's primary attitude display with flight director type guidance.

Structural mode filters in the control laws will ensure that sensor feedbacks to the control surfaces do not excite vehicle structural modes. Whenever possible structural filters will be placed in the feedback path rather than the command path to avoid excessive time delay for the pilot's control inputs.

An off-line simulation of the vehicle and the flight control system will be prepared as part of the flight control system design process. In the preferred implementation, this simulation will utilize the aerodynamic data package created by Calspan from the NASA wind tunnels and the Large Energy National Shock tunnel facility. It will also incorporate the inertial and dimensional data provided by Scaled Composites. This simulation will be used for several purposes: analysis of the flight control law design; vehicle response calculations for the fixed-based ground simulation at Calspan; and the in-flight simulation code for the variable stability Learjet. During the design phase the augmented vehicle response will be compared to several current handling quality design criteria to predict whether the design will provide the desired level of handling qualities.

Particular attention will be paid to the presence of time delay between the pilot's command inputs and the resultant vehicle response as perceived by the pilot. This has been a long term problem with the handling qualities of the Space Shuttle during landing, requiring much expensive training in the Shuttle Training Aircraft to learn to compensate for the delayed response. Another significant concern during the control law design will be to preclude handling quality problems due to control surface rate limiting. Delta wing designs which utilize control surfaces for both pitch and roll are vulnerable to loss of augmentation and control due to rate limiting.

The preferred candidate for the rocketplane of the present invention's flight control system processor is the electronic flight control system built by Lockheed Martin Control systems in Binghamton, N.Y. for the USAF C-17. This system consists of four Line Replaceable Units (LRUs) each of which include three 1750 ISA (Instruction Set Architecture) processors and input/output electronics which perform control law processing, redundancy management and signal processing. Each LRU weighs approximately 40 lbs. They comprise a complete system that uses sensor inputs, provides the operating system for the control laws, and provides the output electronics for the actuators and other control effectors. The flight control processor is based on the 1750 ISA and can be programmed in Ada, Jovial, or assembly code.

The present invention's flight control system will preferably use the existing input and output from the selected flight control computer system. The C-17 FCC is capable of driving up to 9 quad and 4 dual redundant outputs. In the C-17 configuration there are 80 analog to digital converters, 32 digital to analog converters, 99 input discretes, and 76 output discretes. For the present invention's application it will be used to drive 6 quad-redundant control surface actuators (4 wing surfaces, 1 rudder, and 1 body flap). The ten reaction control jets of the present invention will be controlled using the discrete outputs. The C-17 control system architecture has more than sufficient inputs and outputs for the present invention's application.

For the C-17 actuators, position loop closures are accomplished in the flight control computer, rather than on the actuator itself or in a separate device. For this reason similar actuators will be selected for the present invention's actuators based on hinge moment requirements, rate limits and envelope.

The present invention will use the operating system that is used now on the C-17. The redundancy management scheme inherent to the existing control system architecture will be retained where ever practical. Existing digital input signal management and output selection algorithms, LRU redundancy, degraded backup modes, and hydraulic/actuation fault design conditions will be reused or tailored to the present invention's system.

The present invention has been designed to operate at take-off gross weight with a normal limit load factor of 4.5. The weights are divided into five major weight groups: Structure, Propulsion, Equipment, Spacecraft, and Load. The rocketplane's weight estimate of the preferred embodiment is detailed in Table 1.

TABLE 1

| | | | |
|---|---|---|---|
| Structures Group | 14,287 lb | Equipment Group | 4,565 lb |
| Wing | 2,330 lb | Flight Controls | 698 lb |
| Fin | 553 lb | Avionics | 433 lb |
| Fuselage | 8,303 lb | Electrical | 400 lb |
| Undercarriage | 1,208 lb | Instruments | 350 lb |
| Engine Mounts | 197 lb | Furnishings | 496 lb |
| Oxidant Tank | 500 lb | Handling Gear | 37 lb |
| Insulation | | Auxiliary | 145 lb |
| Air Induction System | 972 lb | Power Unit Payload Handling | 100 lb |
| Firewall | 124 lb | Gear | |
| Body Flap | 100 lb | Unallocated | 1,906 lb |
| Propulsion Group | 10,207 lb | Spacecraft Group | 4,566 lb |
| Two F100-PW-200 Engines | 6,110 lb | Reaction Control System | 400 lb |
| Engine Cooling | 341 lb | Life Support | 766 lb |
| Oil Cooling | 46 lb | Thermal Protection | 3,400 lb |
| Engine Controls | 30 lb | Operating Weight | 33,625 lb |
| Starter | 190 lb | Empty | |
| F100 Fuel System | 810 lb | Take off Gross weight | 101,953 lb |
| RD-120 | 2,480 lb | At tanker hookup | 98,147 lb |
| RD-120 Fuel System | 200 lb | At disconnect After rocket burn | 206,125 lb 46,165 lb |
| Load Group | 185,328 lb | After payload | 36,165 lb |
| Crew | 440 lb | release | |
| Fuel for F100 Engines | 12,788 lb | Less residuals Less crew | 34,165 lb 33,725 lb |
| Oil | 100 lb | Less oil | 33,625 lb |
| Fuel for RD-120 | 45,000 lb | Payload | 2,200 lb |
| Oxidizer from Tanker | 117,000 lb | | |
| Upper Stage Assembly | 10,000 lb | | |

The items in the structural group are sized according to a statistical methodology based on the actual weights of fighter aircraft, and then checked for reasonableness. The statistical weight equations reflect the weight of aircraft after they have suffered the weight growth that inevitably accompanies the transition from design to manufacture. They were reduced somewhat to reflect the composite materials used in the design, and the fuselage was reduced in weight by a further ten percent to reflect a lack of large doors in the fuselage (which are common in fighters). The overall weight per unit area of structure is 4.4 $lb/ft^2$, which is about the same as an F-15 or F-16.

The propulsion group is estimated by using actual weights of the F100 and RD-120 powerplants, an estimate of 500 lbs for the feed and pressurization system, and an additional allowance for air-breathing engine support equipment.

The equipment group is estimated by the actual weights of components plus a generous allowance for instruments and furnishings. As before, there is an allowance of 15% margin.

The spacecraft group contains the reaction control system, the life support system for the two pressure-suited crew members, and the thermal protection system, which averages 1.1 $lb/ft^2$. The usual 15% margin is retained.

Finally, the load group contains the crew and the propellants. The residual fraction is assumed to be 1% of the rocket propellant.

The present invention also has a unique ability to be flight ready, when sitting in a hangar on the ground. The rocketplane may be stored with loaded jet fuel, and be called to take off immediately, without the need to fuel. Also, the plane will not exceed FAA noise limits as specified in FAR Part 91.821. The plane may also use conventional runways and airstrips.

TABLE 2

Geometry of the Preferred Embodiment

| | Wing | Tail |
|---|---|---|
| Area ($ft^2$) | 900 | 100 |
| A | 2.2 | 1.2 |
| Taper | 0.15 | 0.30 |
| Sweep | 50 | 45 |
| TIC | 0.1 | 0.1 |
| b | 44.5 | 10.95 |
| C root (ft) | 35.17 | 14.04 |
| C tip (ft) | 5.28 | 4.21 |
| MAC | 23.9 | 10.0 |

Additional Data of the Preferred Embodiment

Payload bay 16 ft x 10.83 diameter
2 Aces II Ejection Seats

| SR-71 Tires | Nose (2) 25 x 6.57 |
| | Main (4) 27.5 x 7.5 |
| | Propulsion |
| Rocket: | One RD-120 |
| | Two F-100-PW-200 |
| | Capture area 6.12 $ft^2$ each |

Fuel/Oxidizer (as shown)

| $LO_2$ | 15,036 Gal |
| JP | 7780 Gal |
| JP | 1690 Gal |

It is understood that while the invention has been described above in conjunction with preferred specific embodiments, the description and examples are intended to illustrate not limit the scope of the invention, which is defined by the scope of the appended claims.

We claim:

1. A rocket propelled airplane, comprising:
a low pressure propellant tank in the wine or fuselage of said airplane, said propellant tank adapted to contain propellant therein;
a rocket engine including a reservoir of cold high pressure gas and a heat exchanger to warm the gas in order to pressurize the propellant tank, wherein said rocket engine is an airbreathing engine having one or more air inlets;
a pump to raise the propellant in the propellant tank from a low pressure to a higher pressure adapted for the use in the rocket engine; and
a turbine to apply energy from the warm high pressure gas to operate said pump, said turbine having an exhaust port which is vented to the propellant tank so that pressure in the propellant tank may be maintained as the propellant is withdrawn from the propellant tank.

2. The rocket propelled airplane of claim 1, wherein said gas is helium.

3. A rocket propelled airplane, comprising:
a low pressure propellant tank in the wing or fuselage of said airplane, said propellant tank adapted to contain propellant therein;
a rocket engine including a reservoir of cold high pressure gas and a heat exchanger to warm the gas in order to pressurize the propellant tank, said rocket engine being an airbreathing engine adapted to receive incoming air and having one or more air inlets;
a pump to raise the propellant in the propellant tank from a low pressure to a higher pressure adapted for the use in the rocket engine; and
a turbine to apply energy from the warm high pressure gas to operate said pump, said turbine having an exhaust port which is vented to the propellant tank so that pressure in the propellant tank may be maintained as the propellant is withdrawn from the propellant tank;
an inlet closure device coupled to said one or more air inlets, said inlet closure device having an open state and a closed state, said open state and said closed state both being independently smooth with respect to the incoming air.

4. The rocket propelled airplane of claim 3, wherein said gas is helium.

5. A rocket propelled airplane, comprising:
a low pressure propellant tank in the wing or fuselage of said airplane, said propellant tank adapted to contain propellant therein;
a rocket engine including a reservoir of cold high pressure gas and a heat exchanger to warm the gas in order to pressurize the propellant tank, wherein said gas is helium;
a pump to raise the propellant in the propellant tank from a low pressure to a higher pressure adapted for the use in the rocket engine; and
a turbine to apply energy of the warm high pressure gas to operate said pump, said turbine having an exhaust port which is vented to the propellant tank so that pressure in the propellant tank may be maintained as the propellant is withdrawn from the propellant tank.

* * * * *